Patented Aug. 19, 1952

2,607,776

UNITED STATES PATENT OFFICE 2,607,776

MERCAPTOETHYL PYRIDINES AND METHOD OF PREPARING SAME

William Howells Vinton, Wilmington, Del., assignor to E. I. du Pont de Nemours & Company, Wilmington, Del., a corporation of Delaware No Drawing. Application December 27, 1945, Serial No. 637,481

19 Claims. (Cl. 260—290)

This invention relates to new substituted pyridines and more particularly to [beta-(acylthio)ethyl]pyridines and their hydrolysis products. It also relates to processes for preparing such compounds.

[Beta-(acylthio)ethyl]pyridines and their hydrolysis products constitute a hitherto unknown class of compounds. They are of considerable interest in chemical syntheses because the acylthio derivative can be hydrolyzed to the corresponding free thiol which can in turn be reacted with various thiol-reactive materials. Moreover, the free thiols are valuable in the compounding of various types of rubber.

An object of this invention is the new class of organic compounds, viz. the [beta-(acylthio)-ethyl]pyridines and their hydrolysis products. Another object is to provide processes for the preparation of these compounds. Other objects will appear hereinafter.

These objects are accomplished by the invention of [beta-(acylthio)ethyl]pyridines and their hydrolysis products and the processes for preparing them which are described below. These substituted ethylpyridines have the general formula

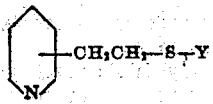

in which Y represents an acyl radical or hydrogen.

The process for the formation of [beta-(acylthio)ethyl]pyridines is illustrated by the following equation for the preparation of 2-[beta-(acetylthio)ethyl]pyridine:

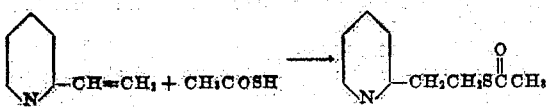

The hydrolysis of [beta-(acylthio)ethyl]pyridines is illustrated by the following equation for the preparation of 2-(beta-mercaptoethyl)-pyridine:

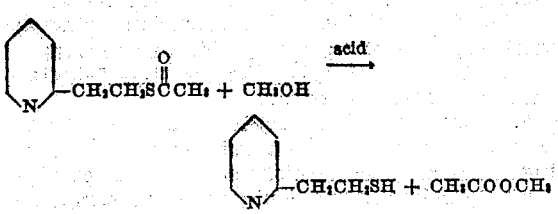

The vinylpyridines used in the preparation of [beta-(acylthio)ethyl]pyridines of this invention may be prepared by dehydrating beta-pyridylethanols, e. g., by heating the beta-pyridylethanol in contact with an alkali metal hydroxide at subatmospheric pressure, as described in U. S. application Serial No. 605,835, filed July 18, 1945, now abandoned, by L. F. Salisbury.

The invention is illustrated by the following examples in which the proportions of the ingredients are expressed as parts by weight.

Example I

To 114 parts of thiolacetic acid cooled to —40° C. is added rapidly with efficient stirring 157.5 parts of 2-vinylpyridine. The increase in temperature of the reaction mixture, caused by the exothermic reaction taking place, is checked by means of strong external cooling so that the reaction temperature gradually rises to 20° C. where it is maintained until the reaction is complete. The progress of the reaction can be followed by iodine titration of an alcoholic solution of a small aliquot portion of the reaction mixture. Subsequent to stirring the mixture at 20° C. for one hour after the addition of the reactants such a titration shows that 96% of the thioacetic acid has reacted. Fractionation of the reaction product under nitrogen gives 247.5 parts (91.3% of theory) of 2-[beta-(acetylthio)ethyl]pyridine, a colorless liquid, boiling point 95–97° C. at 1 mm.; $n_D^{25}$, 1.5480.

Analysis: Calculated for $C_9H_{11}ONS$: C, 59.6%; H, 6.08%; N, 7.75%; S, 17.7%. Found: C, 60.62%; H, 6.31%; N, 8.54%; S, 16.97%.

Example II

To a solution of 53 parts of dry hydrogen chloride in 600 parts of methanol is added slowly with cooling 106.2 parts of 2-[beta-(acetylthio)-ethyl]pyridine, whereupon a mild evolution of heat occurs and the temperature reaches 45° C. After standing at room temperature for 16 hours, the acid is neutralized by addition of a sodium methylate solution prepared by dissolving 33.3 parts of sodium in methanol, and the resulting precipitate of sodium chloride is filtered off. After removal of the solvent from the filtrate, there is obtained by fractionation under nitrogen 20 parts of 2-(beta-mercaptoethyl)pyridine, a colorless liquid, boiling point 94° C. at 7 mm.

Analysis: Calculated for $C_7H_9NS$: N, 10.08%; S, 23.00%; thiol S, 23.00%. Found: N, 10.91%; S, 22.20%; thiol S, 23.0%.

Example III

To 15.2 parts of thiolacetic acid cooled to —40° C. is added rapidly with efficient stirring 26.6 parts of 2-vinyl-5-ethylpyridine. The increase in temperature of the reaction mixture, caused by the exothermic reaction taking place, is controlled by strong external cooling so that a temperature of 50° C. is not exceeded during the addition of the vinylpyridine. The reaction mixture is stirred at room temperature (about 25° C.) for another hour, at which time iodine tritration of an aliquot portion of the reaction mixture shows that 98.4% of the thioacetic acid has reacted. Fractionation of the crude product under nitrogen gives 10 parts (24% of theory) of 2-[beta-(acetylthio) ethyl]-5-ethylpyridine, a faintly yellow liquid, boiling point 131–136° C. at 9.5 mm.;

Sp. G. $\frac{25°C.}{4°C.}$, 1.0664; $n_{25}{}^D$, 1.5377

Analysis: Calculated for $C_{11}H_{15}ONS$: C, 63.1%; H, 7.18%; N, 6.70%. Found C, 63.81%; H, 7.44%; N (Dumas), 6.74%.

The invention of [beta-(acylthio)ethyl]pyridines has been illustrated with particular reference to 2-[beta-(acetylthio)-ethyl]pyridine and 2-[beta-(acetylthio)ethyl]-5-ethylpyridine and their preparation from thiolacetic acid and 2-vinylpyridine and 2-vinyl-5-ethylpyridine, respectively. However, other vinylpyridines having a vinyl group on any carbon atom of the heterocyclic ring and optionally having hydrocarbon radicals attached to other carbon atoms in the heterocyclic ring, and other carbothiolic acids may be used to prepare the substituted pyridines of this invention. Specific examples of such vinylpyridines which may be used include: 3-vinylpyridine, 4-vinylpyridine, 2-vinyl-5-methylpyridine, 2-propyl-4-vinylpyridine and 3-ethyl-4-vinylpyridine. In addition to thiolacetic acid, other saturated aliphatic, or aromatic carbothiolic acids such as thiolpropionic, thiolbutyric, hexahydrothiolbenzoic, thiolbenzoic, and 1,4-butanedithiolic acids may be used. Thus, by reaction of the appropriate vinylpyridine and carbothiolic acid, the following specific [beta-(acylthio)ethyl]-pyridines are formed: 3-[beta-(n-propionylthio)ethyl]pyridine, 4-[beta-(hexahydrobenzoylthio)ethyl]pyridine, 2-[beta-(benzoylthio)ethyl]-5-methylpyridine, 2-propyl-4-[beta-(n-butyrylthio)ethyl]-pyridine, 3-ethyl-4-[beta-(acetylthio)ethyl]pyridine, and di[beta-(2-pyridyl)ethyl]dithiolsuccinate. The hydrolysis products of these specific acylthioethylpyridines are 3-(beta-mercaptoethyl)pyridine, 4-(beta-mercaptoethyl)pyridine, 2-(beta-mercaptoethyl)-5-methylpyridine, 2-propyl-4-(beta-mercaptoethyl)pyridine, 3-ethyl-4-(beta-mercaptoethyl)pyridine, and 2-(beta-mercaptoethyl)pyridine, respectively. The vinylpyridine and carbothiolic acid are preferably used in stoichiometrically equivalent proportions in the preparation of these acylthioethylpyridines.

In the process illustrated by Examples I and III the reaction conditions employed are not critical and may be varied over wide limits. Since the reaction between the vinylpyridine and the carbothiolic acid takes place with evolution of heat, it is usually preferable to cool the reaction mixture during the addition of the vinylpyridine to the pre-cooled carbothiolic acid so as to keep the reaction temperature within the range of 20–50° C., and preferably below 25° C., in order to prevent polymerization of the vinylpyridine. The use of strong external cooling also makes it possible to add the vinylpyridine rapidly without losing appreciable quantities of low boiling carbothiolic acids. If desired, the reaction can be carried out without the use of special cooling equipment by adding the vinylpyridine to the carbothiolic acid at a rate which is slow enough that the reaction temperature does not exceed about 50° C. during the addition of the reactants. After the addition of the reactants is completed the stirring of the mixture is continued at ordinary temperatures or, if desired, at elevated temperature, e. g., 50° C. or higher, for a length of time sufficient to complete the reaction. The actual time required depends on the particular reactants and the particular reaction temperature employed. For example, with 2-vinylpyridine and thiolacetic acid, 1 hour at 20–25° C. is sufficient. The progress of the reaction is conveniently followed by iodine titration of alcoholic solutions of small portions of the reaction mixture for unreacted carbothiolic acid.

The reaction proceeds satisfactorily without the use of a solvent; however, a non-reactive organic solvent may be used as a diluent to assist in controlling the temperature of the reaction mixture. In such case, organic liquids such as benzene, saturated aliphatic hydrocarbons, and alcohols may be used.

The hydrolysis products of [beta-(acylthio)-ethyl]pyridines have been illustrated with particular reference to beta-(mercaptoethyl)pyridine prepared under certain reaction conditions; however, other [beta-(acylthio)ethyl]pyridines and other hydrolysis conditions may be employed. In addition to methanol, which is used in Example II, other aliphatic alcohols, preferably low boiling alcohols such as ethyl, propyl, and isobutyl alcohols may be used. Likewise, other strong acid catalysts such as sulfuric and p-toluenesulfonic acids may be employed instead of hydrogen chloride.

The term "substituent" is used in the claims to denote a radical replacing hydrogen on nuclear carbon of the pyridine nucleus.

The foregoing detailed description has been given for clearness of understanding only and no unnecessary limitations should be understood therefrom since obvious modifications will occur to a person skilled in the art.

What is claimed is:

1. 2-[beta-(acetylthio)ethyl]pyridine.

2. A [beta-(acetylthio)ethyl]pyridine wherein any other substituent on carbon of the pyridine nucleus is hydrocarbon.

3. A 2-[beta-(acylthio)ethyl]pyridine wherein any other substituent on carbon of the pyridine nucleus is hydrocarbon.

4. A [beta-(acylthio)ethyl]pyridine wherein any other substituent on carbon of the pyridine nucleus is hydrocarbon.

5. A [beta-mercaptoethyl]pyridine wherein any other substituent on carbon of the pyridine nucleus is hydrocarbon.

6. 2-[beta-mercaptoethyl]pyridine.

7. Process for the prepartion of 2-[beta-(acetylthio)ethyl]-pyridine which comprises bringing thiolacetic acid and 2-vinylpyridine in contact in the liquid state at a temperature of not more than 50° C. and recovering the resulting 2-[beta-(acetylthio)-ethyl]pyridine.

8. Process for the preparation of 2-[beta-(acetylthio)ethyl]pyridine which comprises bringing thiolacetic acid and 2-vinylpyridine in contact at 20–25° C. and recovering the resulting 2-[beta-(acetylthio)ethyl]pyridine.

9. Process for the preparation of a [beta-(acylthio)ethyl]pyridine which comprises bringing a saturated carbothiolic acid in contact with a vinylpyridine in the liquid state at a temperature of not more than 50° C. and recovering the resulting [beta-(acylthio)ethyl]pyridine.

10. Process according to claim 9 wherein the vinylpyridine is, apart from the pyridine nitrogen, entirely hydrocarbon.

11. Process according to claim 9 wherein the vinylpyridine contains only carbon, hydrogen and the one pyridine nitrogen.

12. Process according to claim 17 wherein the carbothiolic acid addition product is hydrolyzed by contacting the same with a solution of a strong acid catalyst in an aliphatic alcohol.

13. A pyridine compound containing sulfur wherein said sulfur is bivalent and is attached through a —CH₂CH₂— bridging radical to carbon of the pyridine nucleus, the remaining valence of said bivalent sulfur being bonded to a monovalent radical of the class consisting of hydrogen and acyl radicals and wherein any other substituent on carbon of the pyridine nucleus is hydrocarbon.

14. Process for the preparation of a [beta-mercaptoethyl]pyridine which comprises bringing a saturated carbothiolic acid in contact with a vinylpyridine wherein any substituent on nuclear carbon of the pyridine nucleus, other than the vinyl substituent, is hydrocarbon in the liquid state at a temperature of not more than 50° C., hydrolyzing the resulting beta-(acylthio)ethylpyridine by contacting the same with a solution, in an aliphatic alcohol, of a strong acid catalyst, and recovering the [beta-mercaptoethyl]pyridine.

15. 2-[beta-(acetylthio)ethyl]-5-ethylpyridine.

16. Process for the preparation of 2-[beta-(acetylthio)ethyl]-5-ethylpyridine which comprises bringing thiolacetic acid and 2-vinyl-5-ethylpyridine in contact in the liquid state at a temperature of not more than 50° C. and recovering the resulting 2-[beta-(acetylthio)ethyl]-5-ethylpyridine.

17. Process for the preparation of a pyridine compound containing sulfur wherein said sulfur is bivalent and is attached through a

—CH₂—CH₂— bridging radical to carbon of the pyridine nucleus, the remaining valence of said bivalent sulfur being bonded to a monovalent radical of the class consisting of hydrogen and acyl radicals which comprises bringing a saturated carbothiolic acid in contact with a vinylpyridine wherein any substituent on nuclear carbon of the pyridine nucleus, other than the vinyl substituent, is hydrocarbon in the liquid state at a temperature of not more than 50° C. until the carbothiolic acid/vinylpyridine addition product is obtained.

18. 2[beta-mercaptoethyl]pyridine, having the following formula:

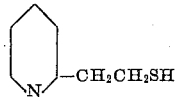

19. Process according to claim 18 wherein the carbothiolic acid addition product is hydrolyzed by contacting the same with a solution of a strong acid catalyst in an alkanol of one to four carbons.

WILLIAM HOWELLS VINTON.

REFERENCES CITED

The following references are of record in the file of this patent:

Chem. Zentralblatt, 1939, II, p. 3412.